Figure 5:
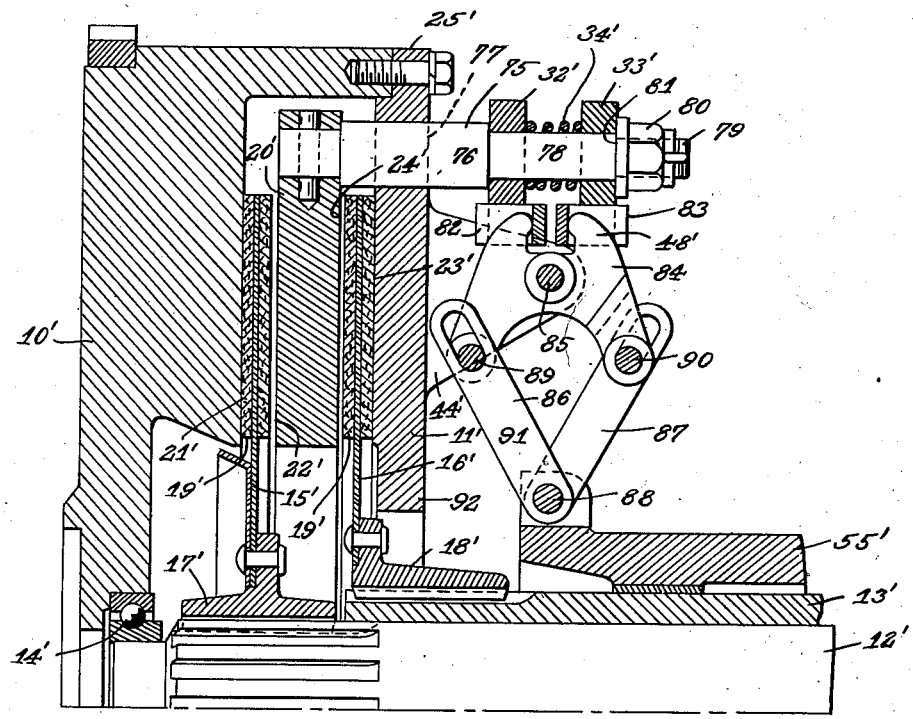

June 26, 1945.   W. V. THELANDER   2,379,024
TWO-WAY CLUTCH
Filed Dec. 12, 1941   2 Sheets-Sheet 1
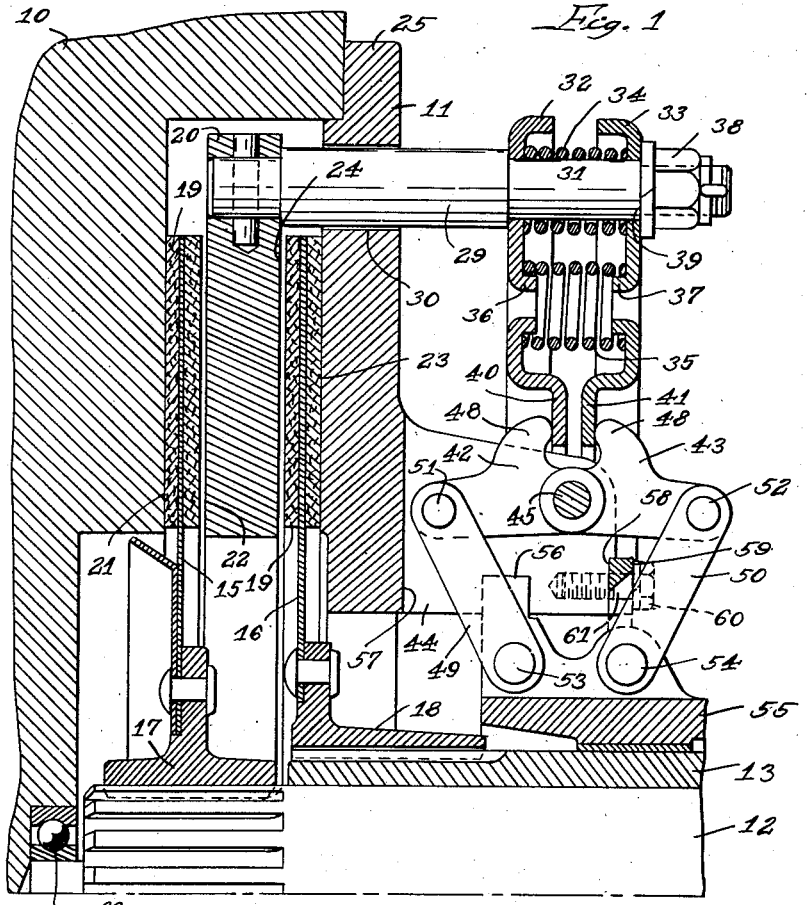
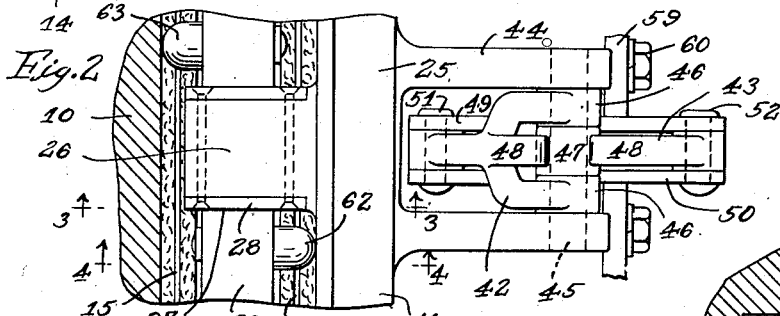
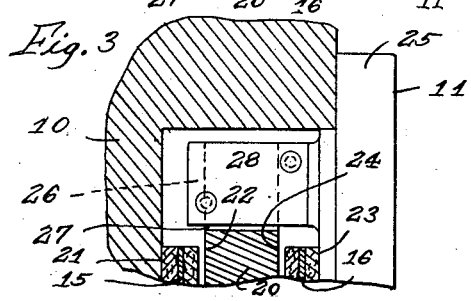
Inventor:
W. Vincent Thelander
By
McCanna, Wintercorn & Morsbach
Attys.

June 26, 1945.　　W. V. THELANDER　　2,379,024
TWO-WAY CLUTCH
Filed Dec. 12, 1941　　2 Sheets-Sheet 2

Inventor:
W. Vincent Thelander
By
McCanna, Wintercorn & Morsbach
Attys.

Patented June 26, 1945

2,379,024

UNITED STATES PATENT OFFICE 2,379,024

TWO-WAY CLUTCH

W. Vincent Thelander, Auburn, Ind.

Application December 12, 1941, Serial No. 422,614

24 Claims. (Cl. 192—48)

This invention relates to friction clutches and is more particularly concerned with a new and improved two-way clutch especially designed for use with a two-rate transmission in a tractor, tank, truck, or the like, but of course is suitable for other uses.

The principal object of my invention is to provide a friction clutch of the kind mentioned, in which a single pressure plate is arranged to cooperate selectively with either of two clutch disks, the one driving a shaft associated with one gear train and the other driving a quill surrounding the shaft and associated with the other gear train, whereby when the one disk is engaged the other turns idly with its gear train, and vice versa, the purpose being to enable quick change in the drive ratio by merely shifting the clutch instead of having to shift gears in the transmission.

An important feature of the present invention consists in the provision of a single spring means outside the clutch proper and hence isolated from the parts subject to heating in the operation of the clutch, the said single spring means cooperating with clutch actuating levers so as to apply spring pressure to the pressure plate in either direction, said spring means affording substantially constant pressure on the pressure plate in either position of clutch engagement and permitting movement past dead center position of the toggle linkage operating the actuating levers, whereby the clutch is automatically maintained in either engaged position under spring pressure until moved manually to neutral position or to the other engaged position.

Another object of my invention consists in the provision of spring pressed plungers on the pressure plate, some of which project forwardly for engagement with the back face of the flywheel and others of which project rearwardly for engagement with the back plate to maintain the pressure plate in a central position clear of both clutch disks when the throw-out collar is in neutral position.

The invention is illustrated in the accompanying drawings, in which—

Figure 6:
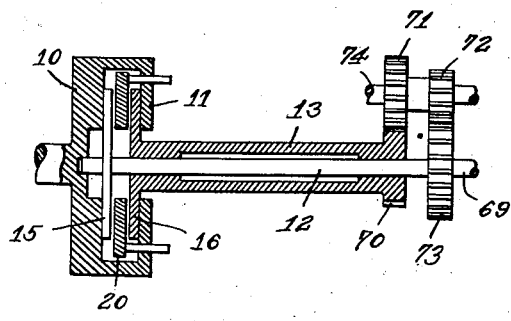

Figure 1 is a longitudinal section through a two-way clutch made in accordance with my invention, half of the complete section being omitted to conserve space and permit showing the parts on a larger scale;

Figs. 2, 3, and 4 are fragmentary sectional details showing other portions of the clutch of Fig. 1, Fig. 3 being a sectional detail on the line 3—3 of Fig. 2, and Fig. 4 being a sectional detail on the line 4—4 of Fig. 2;

Fig. 5 is a section similar to Fig. 1, illustrating another clutch of modified or alternative construction, and Fig. 6 is a diagrammatic illustration of the two-rate transmission in connection with which the clutches of my invention are employed.

Similar reference numerals are applied to corresponding parts throughout the views.

Referring first to Figs. 1 to 4, the reference numeral 10 designates the flywheel of an engine, and 11 the back plate thereon. 12 is a driven shaft extending rearwardly from the flywheel adapted for direct connection with the propeller shaft or to be extended into the front end of the gear box of a transmission, and 13 is a quill surrounding the shaft and serving as an auxiliary driven member, the shaft 12 being for high ratio drive and the quill 13 for low ratio drive, as will soon appear. The shaft 12 has the usual pilot bearing 14 supporting the front end thereof at the center of the flywheel 10. 15 and 16 are clutch disks, the disk 15 having its center hub 17 splined on the front end of the shaft 12 to transmit drive from the flywheel to the shaft when the disk 15 is engaged, and the disk 16 having its hub 18 splined on the front end of the quill 13 to transmit drive from the flywheel to the quill when the disk 16 is engaged. At 19 are shown the usual pads or facings on the clutch disks, and at 20 is indicated a pressure plate between the two disks, adapted when moved forwardly to engage disk 15 with the driving face 21 on the back of the flywheel and the companion driving face 22 on the front of the pressure plate. The pressure plate is also movable rearwardly for engagement with disk 16 to cause engagement thereof with the driving face 23 on the back plate 11 and the companion driving face 24 on the back of the pressure plate. The latter is suitably cast like the flywheel and back plate and the faces 21—24 are accurately machined on these cast parts to cause smooth clutch engagement. The back plate is suitably bolted to the flywheel by means of its marginal flange portion 25 and has a plurality of drive lugs 26 cast integral therewith and projecting forwardly therefrom in circumferentially spaced relation for slidable driving engagement in radial notches 27 in the periphery of the pressure plate 20. Hardened wear plates 28 are riveted onto opposite sides of the lugs 26, as shown, to minimize wear. The pressure plate has a plurality of posts 29 rigidly attached to and projecting rearwardly from the peripheral portion thereof in circumferentially spaced relation. These posts extend freely through holes 30 provided in the back plate, and have reduced rear end portions 31 for slidably mounting stamped sheet metal rings 32 and 33, through which the reduced end portions 31 of the posts project, as shown. The reduced end portions 31 of the posts also serve as supports for coiled compression springs 34 which surround these end portions 31 and have engagement at their opposite ends with the rings 32 and 33. Additional coiled compression springs 35 are interposed between the rings and supported at their opposite ends by hollow cylindrical bosses 36 and 37 struck inwardly from the rings. The springs 34 and 35 are all preloaded when nuts 38 threaded on the further reduced ends of the posts 29 are tightened against the shoulders 39. The rings 32 and 33 have annular flanges 40 and 41 on their inner peripheries in concentric relation to the rings and back plate and pressure plate, and these flanges are in axially spaced relation so that clutch actuating levers 42 and 43 for selective engagement of the clutch in either of the two operative positions of the pressure plate can further compress the springs to have the clutch engaged under increased spring pressure in either of the two aforesaid positions of the pressure plate. The levers 42 and 43, of which there will preferably be six sets in equally circumferentially spaced relation with respect to the back plate, are mounted in paired relation, as shown in Fig. 2, between lugs 44 on common pivot pins 45, each of the levers 42 being bifurcated, as indicated, to provide two bearings 46 to receive therebetween the single bearing 47 of the associated lever 43. Fingers 48 on the levers project radially outwardly and have rounded outer end portions for sliding engagement with the flanges 40 and 41, as clearly appears in Fig. 1. Toggle links 49 and 50 are pivotally connected to the ends of the levers 42 and 43 remote from the pivot pin 45, as at 51 and 52, and these links are pivotally connected, as at 53 and 54, to a manually reciprocable throw-out collar 55. There are, of course, as many sets of toggle links 49 and 50 as there are levers 42 and 43. The pivots 53 and 54 are much closer together than the pivots 51 and 52 so that when the collar 55 is moved forwardly from the neutral position shown the links 49 move the levers 42 in a clockwise direction toward operative position as the pivots 53 move toward a plane through the pivots 51 normal to the axis of rotation, the levers 43 meanwhile being retracted from operative relationship to the flange 41 by the links 50. On the other hand in the rearward movement of the collar 55 from the neutral position shown, the links 50 move the levers 43 in a counterclockwise direction toward operative position as the pivots 54 move toward a plane through the pivots 52 normal to the axis of rotation, the levers 42 meanwhile being retracted from operative position to the flange 40 by the links 49. In the initial movement of the levers 42 toward operative position, the pressure plate 20 is brought into engagement with the clutch disk 16, and in the further movement the ring 32 is moved toward the ring 33 to compress the springs 34 and 35, thereby engaging the clutch disk 16 under a pressure substantially above the preload pressure of the springs. In the initial movement of the levers 43 toward operative position, the pressure plate 20 engages the clutch disk 15, and thereafter in the further movement of the levers the ring 33 is moved toward the ring 32 so as to further compress the springs 34 and 35 and engage the clutch disk under a pressure substantially above the preload pressure. The present clutch is of the "over-center" type and provision is accordingly made for movement of the throw-out collar 55 past the dead center positions, both in forward movement from the neutral position and in rearward movement from the neutral position. Thus, for example, in the forward movement of the collar 55 there is maximum compression of the springs when the pivots 53 are in dead center relationship to the pivots 51, namely, when said pivots are in the same plane with the pivots 51 normal to the axis of rotation, and at that point the lug 56 on the collar 55 is in closely spaced relation to the back face 57 on the back plate and is arranged to be brought into engagement with said face by the slight amount of additional forward movement of the collar 55 necessary, the toggle links 49 in that slight additional movement being moved "over center." There is, therefore, no appreciable reduction in spring pressure in the movement past center, but the spring pressure is made effective to hold the throw-out collar resiliently in the extreme forward position so that the clutch is not apt to be accidentally disengaged. Generally speaking, the same operation occurs in the rearward movement of the collar 55, the springs having maximum compression when the pivots 54 are in dead center relationship to the pivots 52, and the lug 56 being in closely spaced relation under those conditions to the front face 58 of a ring 59 carried on the back plate. Slight further rearward movement of the collar 55 under those conditions brings the lug 56 into engagement with the ring 59 and the toggle links 50 and is thereby moved "over center." Here again it is clear that there is very little reduction in spring pressure as a result of the movement over center and the spring pressure is made effective to hold the collar 55 resiliently in the extreme engaged position to avoid accidental disengagement of the clutch. The ring 59 is fastened to the lugs 44 by means of screws 60 and, as indicated at 61, is cut away on the inner periphery to provide the required operating clearance for the links 50. When the collar 55 is in the neutral position shown, spring pressed plungers 62 and 63 mounted in the peripheral portion of the pressure plate 20 are effective to hold the collar yieldingly in that position so as to prevent accidental engagement of the clutch, the plungers 62 serving yieldingly to prevent rearward movement of the pressure plate by light frictional contact with the inner face 23 of the back plate, and the plungers 63 serving likewise to prevent forward movement of the pressure plate by light frictional contact with the back face 21 of the flywheel. There are preferably three plungers 62 in equally circumferentially spaced relation relative to the pressure plate 20 and three plungers 63 in equally circumferentially spaced relation relative to the pressure plate 20. These plungers are preferably disposed in pairs on opposite sides of the notches 27 in the pressure plate, as illustrated in Fig. 2, there being preferably three drive lugs 26 on the back plate to cooperate with three equally circumferentially spaced notches 27 in the periphery of the pressure plate. Each of the plungers 62 and 63 has a loose working fit in a bore 64, as shown in Fig. 4, and has a reduced stem portion 65 reciprocable freely in a hole 66 communicating with the bore. A light coiled compression spring 67 surrounds the stem 65 in the bore 64 and acts to hold the plunger normally in the extended position. A washer 68 riveted on the outer end of the stem 65 limits the outward movement of the plunger.

In operation, the clutch, as previously indicated, is used in conjunction with a two-rate transmission where the shaft 12, as shown in Fig. 6, extends rearwardly from the clutch and has the rear end portion 69 either directly connected through a universal joint with the propeller shaft of the tractor, truck, tank, or other vehicle or extended into the front end of the gear box of a change speed transmission providing any desired number of speeds for forward and reverse drive. The quill 13 which provides the low rate drive has a gear 70 on the rear end thereof meshing with the larger gear 71 of a two-gear cluster, the smaller gear 72 of which meshes with a large gear 73 on the shaft 12, whereby to drive the shaft 12 at a reduced speed when the disk 16 on the quill 13 is engaged. The cluster 71—72 is supported on a spindle 74 suitably mounted in spaced parallel relation to the shaft 12 and quill 13. Of course, when the disk 15 on the shaft 12 is engaged, the quill 13 and disk 16 are driven idly by reason of the reduction gearing connection with the shaft 12. Forward movement of the throw-out collar 55 by means of a manually operable clutch pedal or lever (not shown) causes engagement of the disk 16 in the manner previously described. When the throw-out collar 55 is moved rearwardly by means of a manually operable clutch pedal or lever, the disk 15 is engaged in the manner previously described. The springs 34 and 35 in addition to providing resilient engagement so that close adjustment is not required even though the clutch is of the over-center type provide substantially constant pressure and accordingly non-slipping engagement regardless of the usual wear on the clutch facings 19. In addition the springs, as previously described, act to hold the throw-out collar 55 resiliently in either extreme position to avoid likelihood of accidental disengagement of the clutch. On the other hand when the throw-out collar 55 is in the neutral position shown in Fig. 1, the plungers 62 and 63 hold the pressure plate 20 yieldingly in the mid-position out of engagement with both disks 15 and 16 so that the likelihood of accidental engagement of the clutch is avoided.

The clutch shown in Fig. 5 is similar to that disclosed in Figs. 1 to 4 and is also intended to be used with a two-rate transmission like that shown in Fig. 6. In this clutch the parts that correspond to parts in the other clutch have been numbered correspondingly, using prime numbers. The posts 75 rigid with and projecting rearwardly from the pressure plate 20' have flat faces 76 on the opposite sides thereof and have a close working fit in correspondingly shaped holes 77 provided in the back plate 11' to provide a sliding driving connection between the pressure plate and back plate. The posts 75, of which there are preferably six in equally circumferentially spaced relation relative to the back plate, have reduced cylindrical end portions 78, which are further reduced at their extremities 79 and threaded to receive nuts 80 to hold the cast rings 32' and 33' in place on the posts with coiled compression springs 34' compressed therebetween, similarly as in the other clutch. When the washers under the nuts 80 are tightened against the shoulders 81, a predetermined preload pressure is established. Hardened steel stirrups 82 and 83 are set in the cast rings 32' and 33', respectively, for cooperation with actuating forks 84 pivoted, as at 85, between lugs 44' cast integral with and projecting rearwardly from the back plate 11'. The fingers 48' on each fork are engaged in the associated stirrups 82 and 83 so that when the fork 84 is oscillated in one direction or the other, the pressure plate 20' is moved correspondingly and the springs 34' and such other springs as may be provided between the rings 32' and 33', like the springs 35 in Fig. 1, are compressed beyond the preload pressure after the pressure plate has engaged the clutch disk 15' or 16', as the case may be. The fork 84 is arranged to be oscillated in either direction from the central neutral position shown by reciprocation of the throw-out collar 55' through the lost motion link connections shown, links 86 and 87 being pivotally connected at one end on a common pivot pin 88 to the throw-out collar and having pin and slot connections at their other ends with the fork 84, as indicated at 89 and 90. The pressure plate 20', it will be understood, is equipped with spring pressed plungers like those shown in the other clutch, so as to hold the pressure plate yieldingly in the middle neutral position and avoid likelihood of accidental engagement of the clutch. The forward end 91 of the throw-out collar is arranged to engage the back face 92 of the back plate when the throw-out collar is moved to an extreme forward position where the pivots 88 are moved slightly past dead center relationship to the pivots 89, similarly as in the over-center movement described in the other clutch. Similar provision may be made for limiting movement of the throw-out collar past the dead center position in its rearward movement as described in the other clutch. In that way the clutch is held engaged resiliently and there is avoided likelihood of accidental disengagement, and, of course, the springs 34' and such other springs as may be provided between the rings 32' and 33' afford substantially constant engaging pressure to compensate for wear in the operation of the clutch, similarly as in the other clutch. The operation of this clutch is so closely similar to the operation of the other clutch no further description is considered necessary.

It is believed the foregoing description conveys a good understanding of the objects and advantages of my invention. The appended claims have been drawn to cover all legitimate modifications and adaptations.

I claim:

1. In a friction clutch, the combination with a flywheel constituting the driving element and a back plate in fixed axially spaced relation to the flywheel and turning therewith, of two separate and independent clutch disks between the flywheel and back plate constituting the driven elements, a pressure plate between said disks turning with the flywheel and back plate and movable in either direction from a neutral position for driving engagement with either of said disks, means driven by each of said clutch disks, and means for moving the pressure plate to either clutch engaging position, comprising a resilient element and an over-center clutch actuating lever means, the resilient element being carried by the pressure plate and flexible in either direction for resilient engagement of said pressure plate with either of said disks, and said over-center clutch actuating lever means being pivoted on the back plate for movement relative to said resilient element to move the pressure plate to driving position, said resilient element cooperating with said lever means so as to be flexed in one direction in the engagement of the pressure plate with one of said disks and flexed in the opposite direction in the engagement of the pressure plate with the other of said disks, whereby to hold either of said disks resiliently engaged.

2. In a friction clutch, the combination with a flywheel constituting the driving element and a back plate in fixed axially spaced relation to the flywheel and turning therewith, of two separate and independent clutch disks between the flywheel and back plate constituting the driven elements, a pressure plate between said disks turning with the flywheel and back plate and movable in either direction from a neutral position for driving engagement with either of said disks, means driven by each of said clutch disks, ring means in concentric relation to said plates connected to turn with the pressure plate and guided on said connection for limited axial movement with respect to the pressure plate and adapted to support springs in caged relation thereto in preloaded condition, a plurality of springs caged in circumferentially spaced relation to said ring means in a compressed condition, and positive acting over-center means operatively associated with said ring means and movable relative to the back plate to move the pressure plate through the medium of said ring means and springs in either direction relative to the back plate and further compress said springs so as to engage the clutch resiliently under increased spring pressure.

3. In a friction clutch, the combination of a flywheel constituting the driving element, a back plate for the flywheel, two separate and independent clutch disks constituting the driven elements, one arranged to engage the flywheel and the other arranged to engage the back plate, a pressure plate turning with the back plate and disposed between said disks to engage either disk selectively, means driven by each of said clutch disks, a plurality of springs carried on the pressure plate in circumferentially spaced relation, positive acting clutch actuating means for moving the pressure plate in either direction to engage the clutch, and a single intermediate means for transmitting pressure from the clutch actuating means to the springs in either direction and thence to the pressure plate, whereby to engage the clutch resiliently in either direction.

4. In a friction clutch, the combination with a flywheel constituting the driving element and a back plate in fixed axially spaced relation to the flywheel and turning therewith, of two separate and independent clutch disks between the flywheel and back plate constituting the driven elements, a pressure plate between said disks turning with the flywheel and back plate and movable in either direction from a neutral position for driving engagement with either of said disks, means driven by each of said clutch disks, a pair of ring members in concentric relation to said plates and guided for a limited axial movement with respect to the pressure plate and adapted to hold and compress a compressible resilient means caged thereon, a compressible resilient means caged on said ring members, and positive acting clutch actuating means movable relative to the back plate and said rings to move the pressure plate in either direction relative to the back plate, whereby to engage either clutch disk and compress said compressible resilient means so as to engage the clutch resiliently.

5. In a friction clutch, the combination with a flywheel constituting the driving element and a back plate in fixed axially spaced relation to the flywheel and turning therewith, of two separate and independent clutch disks between the flywheel and back plate constituting the driven elements, a pressure plate between said disks turning with the flywheel and back plate and movable in either direction from a neutral position for driving engagement with either of said disks, supporting means carried by the pressure plate and adapted to support ring members behind the back plate, means driven by each of said clutch disks, a pair of ring members in concentric relation to said plates and guided on said supporting means for a limited axial movement with respect to the pressure plate and adapted to support springs, a plurality of springs supported in circumferentially spaced relation to said rings, and lever means mounted for pivotal movement relative to the back plate and operatively engaging the rings to move the pressure plate in either direction relative to the back plate to engage either clutch disk and load the aforesaid springs so as to engage the clutch resiliently.

6. In a friction clutch, the combination of a flywheel constituting the driving element, a back plate for the flywheel, two separate and independent clutch disks constituting the driven elements, one arranged to engage the flywheel and the other arranged to engage the back plate, a pressure plate turning with the back plate and disposed between said disks to engage either disk selectively, means driven by each of said clutch disks, a plurality of springs carried on the pressure plate in circumferentially spaced relation, a pair of rings carried on the pressure plate and guided for a limited axial movement with respect thereto and normally supporting said springs compressed in preloaded condition, positive acting lever means mounted for pivotal movement relative to the back plate and operatively engaging said rings to move the pressure plate in either direction relative to the back plate to engage either of said clutch disks and further compress the aforesaid springs so as to engage the clutch resiliently under increased spring pressure, a throw-out member guided for movement toward and away from the back plate, and lever actuating means carried on said throw-out member and arranged upon movement thereof one way or the other from a neutral position to move said lever means to one or the other of two extreme positions in which the clutch is engaged resiliently and locked in such condition so long as said throw-out member is not returned to neutral position.

7. In a friction clutch, the combination of a flywheel constituting the driving element, a back plate for the flywheel, two separate and independent clutch disks constituting the driven elements, one arranged to engage the flywheel and the other arranged to engage the back plate, a pressure plate turning with the back plate and disposed between said disks to engage either disk selectively, means driven by each of said clutch disks, a plurality of springs carried on the pressure plate in circumferentially spaced relation, a pair of rings carried on the pressure plate and guided for a limited axial movement with respect thereto and normally supporting said springs compressed in preloaded condition, positive acting lever means mounted for pivotal movement relative to the back plate and operatively engaging said rings to move the pressure plate in either direction relative to the back plate to engage either of said clutch disks and further compress the aforesaid springs so as to engage the clutch resiliently under increased spring pressure, a throw-out member guided for movement toward and away from the back plate, and means providing a lost motion operating connection between said throw-out member and said lever means.

8. In a friction clutch, the combination of a flywheel constituting the driving element, a back plate for the flywheel, two separate and independent clutch disks constituting the driven elements, one arranged to engage the flywheel and the other arranged to engage the back plate, a pressure plate turning with the back plate and disposed between said disks to engage either disk selectively, means driven by each of said clutch disks, a plurality of springs carried on the pressure plate in circumferentially spaced relation, positive acting lever means for moving the pressure plate in either direction to engage the clutch, a single intermediate ring means for transmitting pressure from the lever means to the springs in either direction, whereby to engage the clutch resiliently in either direction, and spring means on the pressure plate subject to deflection when the clutch is engaged and tending otherwise normally to hold the pressure plate yieldingly in a neutral position between the clutch disks.

9. A friction clutch as set forth in claim 6, including spring means on the pressure plate subject to deflection when the clutch is engaged and tending otherwise normally to hold the pressure plate yieldingly in a neutral position between the clutch disks when the throw-out member is in neutral position.

10. A clutch as set forth in claim 1, including resilient means on the pressure plate subject to deflection when the clutch is engaged and tending otherwise to hold the pressure plate normally in a neutral position out of engagement with both clutch disks.

11. In a clutch mechanism, the combination of clutch disks connected to separate rotary parts, a pressure plate shiftable to driving engagement selectively with either clutch disk, ring means in concentric relation to said plate connected to turn therewith and guided on said connection for limited axial movement with respect thereto and adapted to support springs in caged relation thereto in preloaded condition, a single set of springs caged in circumferentially spaced relation to said ring means in a compressed condition and adapted to apply the spring pressure thereof alike to either disk, and positive acting means cooperating with said ring means to move the pressure plate in either direction to engage either clutch disk resiliently under the spring pressure of the single set of springs and further compress said springs, whereby the clutch disk is engaged resiliently under increased spring pressure that is substantially alike in the engagement of either disk.

12. In a clutch mechanism, the combination of clutch disks connected to separate rotary parts, a pressure plate shiftable to driving engagement selectively with either clutch disk, a single set of springs carried on the pressure plate in circumferentially spaced relation and adapted to apply the spring pressure thereof alike to either disk, positive acting means for moving the pressure plate in either direction to engage either clutch disk resiliently under the spring pressure of the single set of springs, and a single intermediate means for transmitting pressure from the positive acting means to the springs in either direction, whereby to engage the clutch resiliently in either direction and under substantially the same spring pressure.

13. In a clutch mechanism, the combination of clutch disks connected to separate rotary parts, a pressure plate shiftable to driving engagement selectively with either clutch disk, a single spring means carried on the pressure plate and adapted to apply the spring pressure thereof alike to either disk, and positive acting means operatively connected with the pressure plate through the medium of said spring means so as to transmit pressure therethrough to the pressure plate in either direction, whereby to engage the clutch resiliently in either direction and under substantially the same spring pressure.

14. In a clutch mechanism, the combination of clutch disks connected to separate rotary parts, a pressure plate shiftable to driving engagement selectively with either clutch disk, annular spring caging means connected for rotation with the pressure plate in concentric relation therewith, a single set of springs caged in circumferentially spaced relation to said annular caging means in compressed condition to a preload pressure, and positive acting means having operative engagement with the annular caging means to actuate said pressure plate for resilient engagement of either disk under increased spring pressure that is substantially alike in the engagement of either disk, said positive acting means being arranged to compress said springs above the preload pressure after engagement of the pressure plate with either disk.

15. In a clutch mechanism, the combination of clutch disks connected to separate rotary parts, a pressure plate shiftable to driving engagement selectively with either clutch disk, annular spring caging means connected for rotation with the pressure plate in concentric relation therewith, a single set of springs caged in circumferentially spaced relation to said annular caging means, and positive acting means having operative engagement with the annular caging means to actuate said pressure plate for resilient engagement of either disk under spring pressure that is substantially alike in the engagement of either disk, said positive acting means being arranged to compress said springs after engagement of the pressure plate with either disk.

16. In a friction clutch, the combination with a flywheel constituting the driving element and a back plate in fixed axially spaced relation to the flywheel and turning therewith, of two separate and independent clutch disks between the flywheel and back plate constituting the driven elements, a pressure plate between said disks turning with the flywheel and back plate and movable in either direction from a neutral position for driving engagement with either of said disks, means driven by each of said clutch disks, and means for moving the pressure plate to either clutch engaging position, comprising a resilient element and clutch actuating lever means, said resilient element being carried by the pressure plate and flexible in either direction for resilient engagement of the pressure plate with either of said disks, and said clutch actuating lever means being pivoted on the back plate for movement relative to said resilient element to move the pressure plate to driving position, said resilient element cooperating with said lever means so as to be flexed in one direction in the engagement of the pressure plate with one of said disks and flexed in the opposite direction in the engagement of the pressure plate with the other of said disks, whereby to hold either of said disks resiliently engaged.

17. In a friction clutch, the combination with a flywheel constituting the driving element and a back plate in fixed axially spaced relation to the flywheel and turning therewith, of two separate and independent clutch disks between the flywheel and back plate constituting the driven elements, a pressure plate between said disks turning with the flywheel and back plate and movable in either direction from a neutral position for driving engagement with either of said disks, means driven by each of said clutch disks, ring means mounted on the pressure plate in concentric relation thereto to turn therewith and guided on said mounting for limited axial movement with respect to the pressure plate, a plurality of coiled compression springs supported in compressed condition on said rings, and positive acting clutch actuating means operatively associated with said ring means and movable relative to the back plate to move the pressure plate through the medium of said ring means and springs to either clutch engaging position and to further compress the aforesaid springs so that the clutch is engaged resiliently under increased spring pressure.

18. In a clutch mechanism, the combination of two clutch disks connected to separate rotary parts, a ring assembly including pressure plate means disposed between the disks and shiftable to frictional engagement selectively with either disk, and a single spring means in circumferentially spaced relation in the ring assembly and operatively associated with the pressure plate means so as to be stressed substantially alike upon engagement of the pressure plate means with either disk, and positive acting mechanical means for moving said ring assembly selectively in either direction for driving engagement of the pressure plate means with either clutch disk.

19. In a clutch mechanism, the combination of clutch disks connected to separate rotary parts, a pressure plate shiftable to driving engagement selectively with either clutch disk, a single spring means for resilient engagement of the clutch with either disk carried on the pressure plate in circumferentially spaced relation, and positive acting mechanical means cooperating with the spring means to transmit pressure resiliently through said spring means to the pressure plate in either direction, whereby to engage the clutch resiliently in either direction with substantially the same spring pressure.

20. In a friction clutch, the combination of a flywheel constituting the driving element, a back plate for the flywheel, two separate and independent clutch disks constituting the driven elements, one arranged to engage the flywheel and the other arranged to engage the back plate, a pressure plate turning with the back plate and disposed between said disks to engage either disk selectively, means driven by each of said clutch disks, a plurality of springs carried on the pressure plate in circumferentially spaced relation, cage means for said springs, a throw-out member reciprocable toward and away from the back plate, and over-center lever means operatively connecting said throw-out member and said cage means to transmit pressure through said springs to the pressure plate in either direction and lock the clutch selectively in either engaged position.

21. In a friction clutch, the combination with a flywheel constituting the driving element and a back plate in fixed axially spaced relation to the flywheel and turning therewith, of two separate and independent clutch disks between the flywheel and back plate constituting the driven elements, a pressure plate between said disks turning with the flywheel and back plate and movable in either direction from a neutral position for driving engagement with either of said disks, means driven by each of said clutch disks, a pair of ring members in concentric relation to said plates and guided for a limited axial movement with respect to the pressure plate and adapted to hold and compress a compressible resilient means thereon, a compressible resilient means caged on said ring members, a throw-out member reciprocable toward and away from the back plate, and over-center lever means operatively connecting said throw-out member and said ring members so as to permit engagement of the clutch resiliently in either direction and lock the clutch in either engaged position.

22. In a friction clutch, the combination with a flywheel constituting the driving element and a back plate in fixed axially spaced relation to the flywheel and turning therewith, of two separate and independent clutch disks between the flywheel and back plate constituting the driven elements, a pressure plate between said disks turning with the flywheel and back plate and movable in either direction from a neutral position for driving engagement with either of said disks, means driven by each of said clutch disks, supporting means carried by the pressure plate and adapted to support ring members behind the back plate, a pair of ring members in concentric relation to said plates and guided on said supporting means for a limited axial movement with respect to the pressure plate and adapted to support springs, a plurality of springs supported in circumferentially spaced relation to said rings, a throw-out member reciprocable toward and away from the back plate, and over-center lever means operatively connecting said throw-out member and said ring members so as to permit engagement of the clutch resiliently in either direction and lock the clutch in either engaged position.

23. In a friction clutch, the combination of a flywheel constituting the driving element, a back plate for the flywheel, two separate and independent clutch disks constituting the driven elements, one arranged to engage the flywheel and the other arranged to engage the back plate, a pressure plate turning with the back plate and disposed between said disks to engage either disk selectively, means driven by each of said clutch disks, a plurality of springs carried on the pressure plate in circumferentially spaced relation, a pair of rings carried on the pressure plate and guided for a limited axial movement with respect thereto and normally supporting said springs compressed in preloaded condition, a throw-out member guided for movement toward and away from the back plate, and over-center lever means providing a lost motion operating connection between said throw-out member and said rings to permit resilient engagement of the clutch in either direction in which the springs are further compressed for engagement of the clutch under increased spring pressure, and also permit locking of the clutch in either engaged position.

24. A friction clutch, comprising two separate and independent clutch disks constituting the driven elements, a pressure plate turning with a flywheel and disposed between said disks and movable axially from a neutral position in either direction for driving engagement with either disk, a spring means supported on one side of the pressure plate in preloaded condition and caged on the supports, and positive acting mechanical clutch actuating means for moving said supports and the pressure plate through said preloaded spring means in either direction to engage either clutch disk with substantially the same engaging pressure by compression of the same spring means above the preload pressure to the same extent in either such engagement.

W. VINCENT THELANDER.